United States Patent
Kawakami et al.

(10) Patent No.: US 6,172,969 B1
(45) Date of Patent: Jan. 9, 2001

(54) CDMA RECEIVER EMPLOYING SUCCESSIVE CANCELLATION OF TRAINING-SIGNAL INTERFERENCE

(75) Inventors: Eiichiro Kawakami; Satoru Shimizu, both of Tokyo (JP)

(73) Assignee: Oki Electric Industry Co., Ltd., Tokyo (JP)

( * ) Notice: Under 35 U.S.C. 154(b), the term of this patent shall be extended for 0 days.

(21) Appl. No.: 09/014,709

(22) Filed: Jan. 28, 1998

(30) Foreign Application Priority Data

Jan. 31, 1997 (JP) .................................... 9-018473

(51) Int. Cl.[7] .................................... H04R 7/216
(52) U.S. Cl. ............................ 370/342; 370/335
(58) Field of Search .................................... 370/342, 335, 370/333, 479; 375/346, 208, 206, 207; 455/296

(56) References Cited

U.S. PATENT DOCUMENTS 5,511,068 * 4/1996 Sato ................................ 370/335
5,533,012 * 7/1996 Fukasawa et al. ................ 370/342
5,579,304 * 11/1996 Sugimoto et al. ................ 370/342

OTHER PUBLICATIONS

Duel–Hallen et al., "Multiuser Detection for CDMA Systems" IEEE Personal Communications, Apr. 1995., pp. 45–58.

U.S. application No. 08/883,959, filed Jun. 27, 1997.

* cited by examiner

Primary Examiner—Michael Horabik
Assistant Examiner—Prewell Jones
(74) Attorney, Agent, or Firm—Venable; Robert J. Frank (57) ABSTRACT

A code division multiple access receiver, which receives a signal combining both information signals and training signals, has an interference canceler that successively estimates and cancels interference caused by the training signals. The interference canceler also successively estimates and cancels interference caused by the information signals. The estimating and canceling process is preferably repeated, for each training signal and each information signal, in two or more stages.

17 Claims, 5 Drawing Sheets

CDMA RECEIVER EMPLOYING SUCCESSIVE CANCELLATION OF TRAINING-SIGNAL INTERFERENCE

BACKGROUND OF THE INVENTION

The present invention relates to a code division multiple access communications receiver.

Code division multiple access (hereinafter, CDMA) is undergoing intensive development as a technique for the efficient utilization of bandwidth in mobile communications systems. CDMA uses a spectrum spreading process to enable multiple signals to share the same frequency band. A desired signal is extracted from the shared band by a despreading process.

In a direct sequence CDMA system, the different signals are distinguished by the use of different spreading codes. When a signal is extracted, the extracted signal usually contains interference from other signals, due to imperfect orthogonality of the spreading codes and other factors.

A known method of canceling this so-called co-channel interference estimates the signal received from each transmitting station on each transmission path, and subtracts, from the combined received signal, the signals estimated to have been received from stations other than the desired station. The subtractions may be performed one after another in a serial manner, or they may be performed in a parallel manner after all signals have been estimated. The entire process may be repeated in two or more stages.

Besides canceling interference, it is also necessary to estimate and correct for communication channel effects. To aid in channel estimation, some CDMA systems have each station transmit a known signal, referred to as a pilot signal or training signal, in addition to the signal containing the unknown information the station is seeking to communicate. The pilot signal or training signal may be transmitted continuously, or at regular intervals, or only at the beginning of communication, or at the beginning of communication and at other times as necessary. The term 'training signal' will be used below to cover all of these modes of transmission.

Aside from having known content, the training signal is transmitted like an information signal, although with a different spreading code. Accordingly, training signals also cause co-channel interference, which must be canceled in the receiver. Conventional CDMA receivers have canceled training-signal interference in a single operation, prior to the cancellation of interference due to the information signals.

This conventional method of canceling training-signal interference would be satisfactory if the received form of each training signal could be accurately predicted, but varying channel effects make accurate prediction difficult, and the conventional method usually leaves a certain amount of residual training-signal interference uncanceled. All information signals extracted from the received signal are affected by this residual training-signal interference, so residual training-signal interference becomes a significant factor limiting the number of stations that can be accommodated in the shared frequency band. In a cellular communication system, the cell capacity is limited.

SUMMARY OF THE INVENTION

It is accordingly an object of the present invention to cancel training-signal interference more completely.

An attendant object is to increase the capacity of CDMA communication systems employing training signals.

The invented CDMA receiver has an interference canceler that makes successive estimates of interference caused by training signals, successively removes the interference estimated to be caused by the training signals from the received signal, makes successive estimates of interference caused by information signals, successively removes the interference estimated to be caused by the information signals from the received signal, and extracts the information signals from the received signal after the interference estimated to be caused by the training signals and the information signals has been removed. The interference canceler is preferably organized into stages, each stage providing a residual signal to the next stage, where the process of estimating and removing interference due to training signals and information signals is repeated on the residual signal.

BRIEF DESCRIPTION OF THE DRAWINGS

In the attached drawings:

FIG. 2 is a more detailed block diagram showing the internal structure of the interference canceler in a first embodiment of the invention;

DETAILED DESCRIPTION OF THE INVENTION

Embodiments of the invention will be described with reference to the attached illustrative drawings.

First Embodiment

Figure 1:
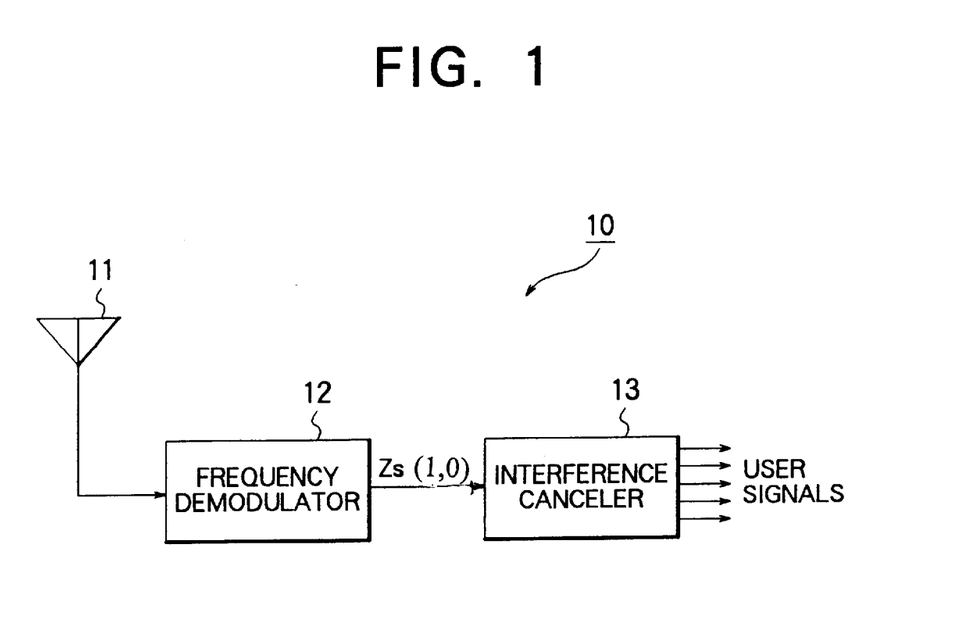
FIG. 1 is a general block diagram of the invented CDMA receiver.

Referring to FIG. 1, the first embodiment is a CDMA receiver 10 comprising an antenna 11, a frequency demodulator 12, and an interference canceler 13. FIG. 2 shows the internal structure of the interference canceler 13. The interference canceler 13 has k stages, where k is a positive integer. The first stage is indicated by reference numeral 21. Each stage comprises n single-station interference cancelers 22, coupled in series, where n is the number of stations transmitting signals to the receiver. Each single-station interference canceler 22 estimates and cancels interference caused by a single transmitting station. Each single-station interference canceler 22 has a training signal estimator (TRAINING SIG. EST.) 23 and an information signal estimator (INFO. EST.) 24, coupled in series with respective adders 25 and 26.

Adders 25 and 26 actually function as subtractors; the minus sign in the drawings identifies the subtracted input signal. Adder 25 subtracts interference estimated by the training signal estimator 23 to have been caused by one station's training signal. Adder 26 subtracts interference estimated by the information signal estimator 24 to have been caused by the station's information signal.

Figure 3:
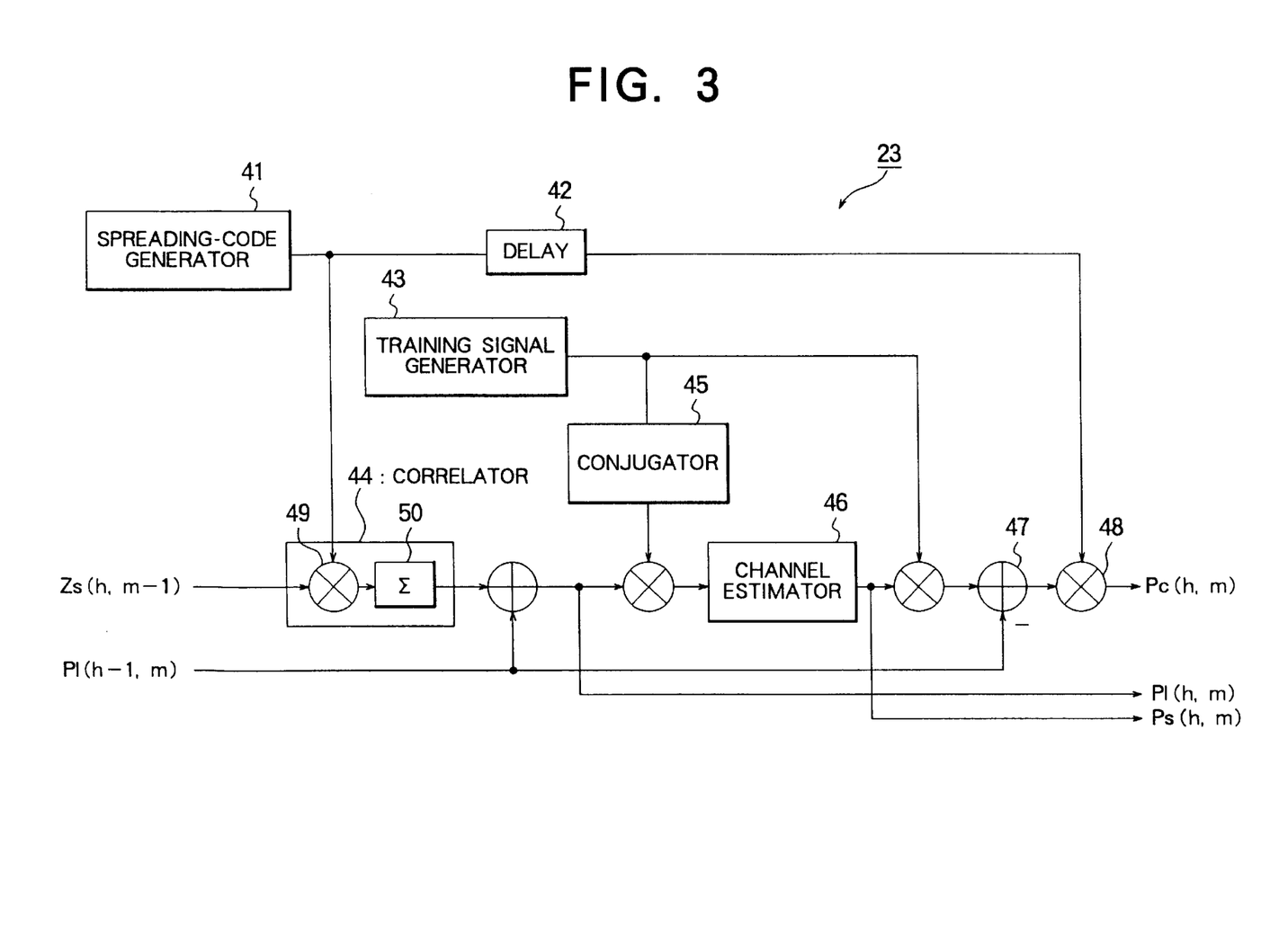
FIG. 3 is a still more detailed block diagram showing the internal structure of the training signal estimators in the first embodiment and in a second embodiment of the invention.

FIG. 3 shows the internal structure of the m-th training signal estimator 23 in the h-th stage, where h and m are positive integers not exceeding k and n, respectively. The constituent elements are a spreading-code generator 41, a delay unit 42, a training signal generator 43, a correlator 44, a conjugator 45, a channel estimator 46, and various adders 47 and multipliers 48 for combining signals output by the above elements. The correlator 44 comprises a multiplier 49 and an accumulator 50.

The spreading-code generators 41 generate the same spreading codes in all k stages, so it is possible to provide spreading-code generators 41 only in the first stage, and re-use the generated spreading codes in the second to k-th stages. Similarly, the training signal generators 43 generate the same training signals in all k stages, so it is possible to provide training signal generators 43 only in the first stage, and re-use the generated training signals in the other stages.

Figure 4:
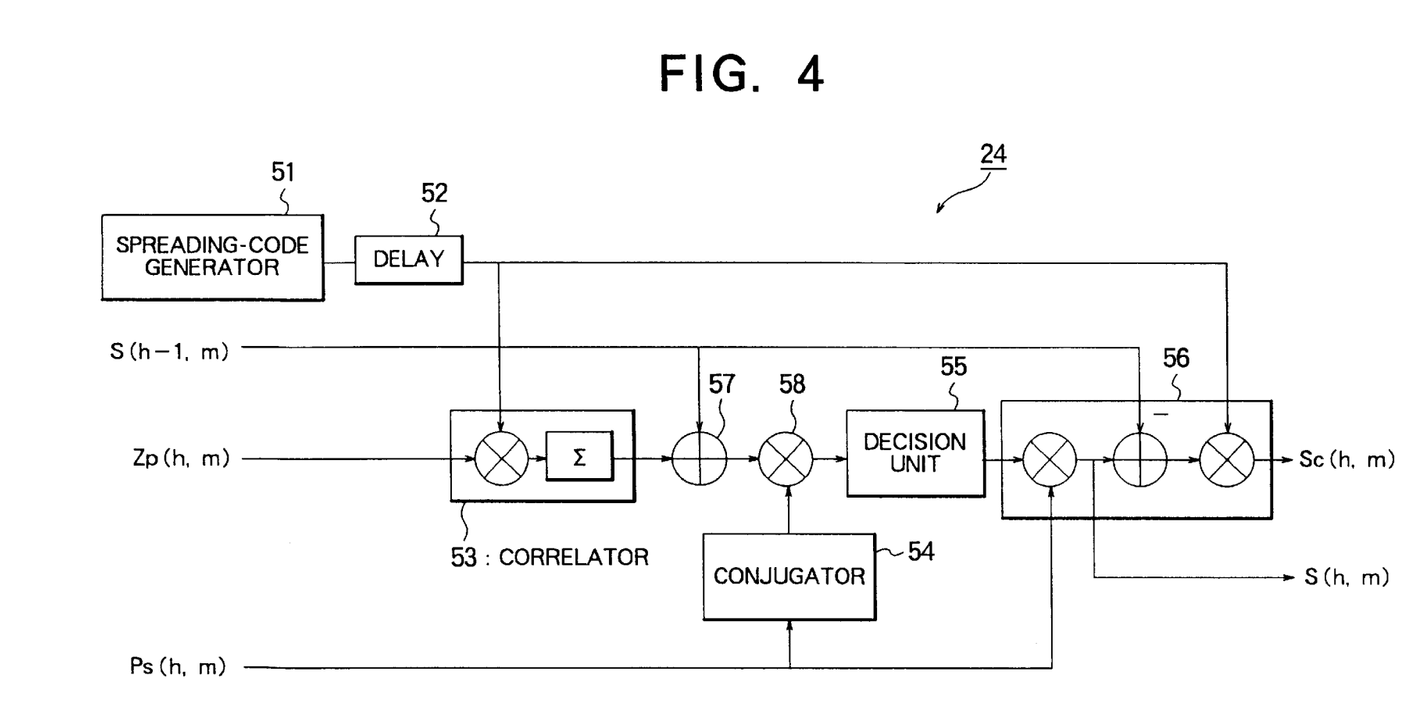
FIG. 4 is a still more detailed block diagram showing the internal structure of the information signal estimators in the first and second embodiments of the invention.

FIG. 4 shows the internal structure of the m-th information signal estimator 24, in the h-th stage 21. The constituent elements are a spreading-code generator 51, a delay unit 52, a correlator 53, a conjugator 54, a decision unit 55, a respreader 56, an adder 57, and a multiplier 58. The spreading-code generators 51 generate the same spreading codes in all k stages, so it is possible to provide spreading-code generators 51 only in the first stage, and re-use the generated spreading codes in the other stages.

The frequency demodulator 12 in FIG. 1 comprises well-known circuits, descriptions of which will be omitted. The interference canceler 13 can be configured by interconnecting separate arithmetic and logic circuits as shown in FIGS. 2, 3, and 4, or by providing a general-purpose processor such as a microprocessor or digital signal processor with software for executing the functions of the individual elements shown in FIGS. 2, 3, and 4. Separate single-station interference cancelers 22 may be provided as shown in FIG. 2, or just one single-station interference canceler 22 may be provided, this single-station interference canceler 22 repetitively performing the process described below for each transmitting station in turn.

Next, the operation will be described.

Referring again to FIG. 1, the antenna 11 receives a combined signal from the n transmitting stations. Each station transmits an information signal spread with one spreading code, and a training signal spread with another spreading code. The frequency demodulator 12 filters, amplifies, and demodulates the combined received signal to obtain a baseband signal, which is denoted Zs(1, 0). The frequency demodulator 12 includes an analog-to-digital converter (not shown), and outputs the baseband signal Zs(1, 0) as a digital signal. The interference canceler 13 estimates each transmitting station's signal values and interference, and removes the interference from the baseband signal to obtain a plurality of user signals containing the final estimates of the information signal values.

Referring again to FIG. 2, the first single-station interference canceler 22 in the first stage 21 receives and processes the baseband signal Zs(1, 0), and outputs a residual signal Zs(1, 1) to the next single-station interference canceler 22 in the first stage 21. This process continues, the last single-station interference canceler 22 in the first stage 21 receiving a residual signal Zs(1, n−1) and outputting a residual signal Zs(1, n), which is also denoted Zs(2, 0). This residual signal Zs(2, 0) is provided to the first single-station interference canceler 22 in the second stage.

Operations in the second and subsequent stages are similar, the m-th single-station interference canceler 22 in the h-th stage receiving a residual signal Zs(h, m−1) and outputting a residual signal Zs(h, m). The final residual signal Zs(h, n) produced in the h-th stage is provided as a residual signal Zs(h+1, 0) to the first single-station interference canceler 22 in the next stage.

In the m-th single-station interference canceler 22 in the h-th stage, the input residual signal Zs(h, m−1) is received by the training signal estimator 23, which also receives a signal Pl(h−1, m), referred to below as an estimated training signal, from the m-th single-station interference canceler 22 in the preceding stage. The estimated training signals Pl(0, m) received in the first stage are all equal to zero, and are omitted from the drawing. The outputs of the training signal estimator 23 are an estimated training signal Pl(h, m), which is supplied to the next stage; an estimated training interference signal Pc(h, m), which is subtracted from the input residual signal Zs(h, m−1) to obtain a difference signal Zp(h, m); and an estimated channel parameter Ps(h, m), which is supplied to the information signal estimator 24 in the same single-station interference canceler 22.

The information signal estimator 24 receives the estimated channel parameter Ps(h, m), the difference signal Zp(h, m), and an estimated information signal S(h−1, m) from the preceding stage. The estimated information signals S(0, m) received in the first stage are all zero, and are omitted from the drawing. Using these inputs, the information signal estimator 24 makes a value decision, outputs an estimated information signal S(h, m) to the next stage, and outputs an estimated information interference signal Sc(h, m), which is subtracted from the difference signal Zp(h, m) to obtain the next residual signal Zs(h, m).

The operation of the training signal estimator 23 and information signal estimator 24 in the m-th single-station interference canceler 22 in the h-th stage will now be explained in more detail.

Referring again to FIG. 3, in the training signal estimator 23, the spreading-code generator 41 generates the spreading code by which the m-th station's training signal was spread. The delay unit 42 delays the output of the spreading-code generator 41 by an amount that compensates for the processing delay in the correlator 44 and channel estimator 46. The training signal generator 43 generates the m-th station's training signal. The training signal and its spreading code are both known, and are the same in all k stages, as noted above.

The correlator 44 correlates the input residual signal Zs(h, m−1) with the spreading code output by the spreading-code generator 41 to obtain a despread signal equal to the residual part of the m-th station's training signal, plus interference and channel effects. The estimated training signal Pl(h−1, m) from the preceding stage is added to this despread signal to re-estimate the training signal. The re-estimated training signal Pl(h, m) is multiplied by the complex conjugate of the known value of the training signal, as obtained from the training signal generator 43 and conjugator 45, to remove the known value of the estimated training signal, leaving only residual interference and channel effects.

The channel estimator 46 estimates the channel effects and outputs them as the estimated channel parameter Ps(h, m). The training signal output by the training signal generator 43 is multiplied by Ps(h, m) to obtain the training signal as modified by the channel effects, then the estimated training signal Pl(h−1, m) from the preceding stage is subtracted, and the result is spread by multiplication with the delayed spreading code from the delay unit 42, to obtain the residual interference Pc(h, m) estimated to have been caused by the m-th station's training signal.

Referring again to FIG. 4, in the information signal estimator 24, the spreading-code generator 51 generates the spreading code that was used to spread the m-th station's information signal. This spreading code is the same in all k stages, as noted above. The delay unit 52 delays the output of the spreading-code generator 51 by an amount that compensates for the processing delay of the correlator 53 and decision unit 55.

The correlator 53 correlates the residual difference signal Zp(h, m) with the spreading code output by the spreading-code generator 51 to obtain a despread signal equal to the residual part of the m-th station's information signal, plus interference and channel effects. The estimated information signal S(h−1, m) from the preceding stage is added to obtain a full estimate of the m-th station's information signal, plus residual interference and channel effects. This full estimate is multiplied by the complex conjugate of the estimated channel parameter Ps(h, m), as calculated by the conjugator 54, to compensate for the channel effects.

The decision unit 55 now makes a new decision as to the value of the information signal, e.g. the value of the current symbol in the information signal. The decision may be a soft decision, made at the power level of the signal received by the decision unit 55, or a hard decision, made at a fixed power level. The value decided on is multiplied by the estimated channel parameter Ps(h, m) to obtain a new estimate of the despread value of the m-th station's information signal S(h, m). The old estimate S(h−1, m) is then subtracted, and the result is multiplied by the delayed spreading code from the delay unit 52 to obtain an estimate of the residual interference Sc(h, m) caused by the m-th station's information signal.

As this process is repeated over k stages, the accuracy of the estimates Ps(h, m), Pl(h, m), and S(h, m) of the channel parameters and the despread values of the received training signals and information signals improves, and the accuracy of the information signal decisions also improves. The decisions made by the decision units 55 in the last (k-th) stage become the user signals output by the interference canceler 13.

Compared with a conventional interference canceler that cancels training-signal interference only once, at the beginning of the interference-canceling operation, the first embodiment cancels training-signal interference more thoroughly, because training-signal interference is also removed from the residual signals. The user signals are accordingly more accurate than with a conventional interference canceler, and the capacity of a CDMA communication system employing the first embodiment can be increased.

Second Embodiment

Figure 5:
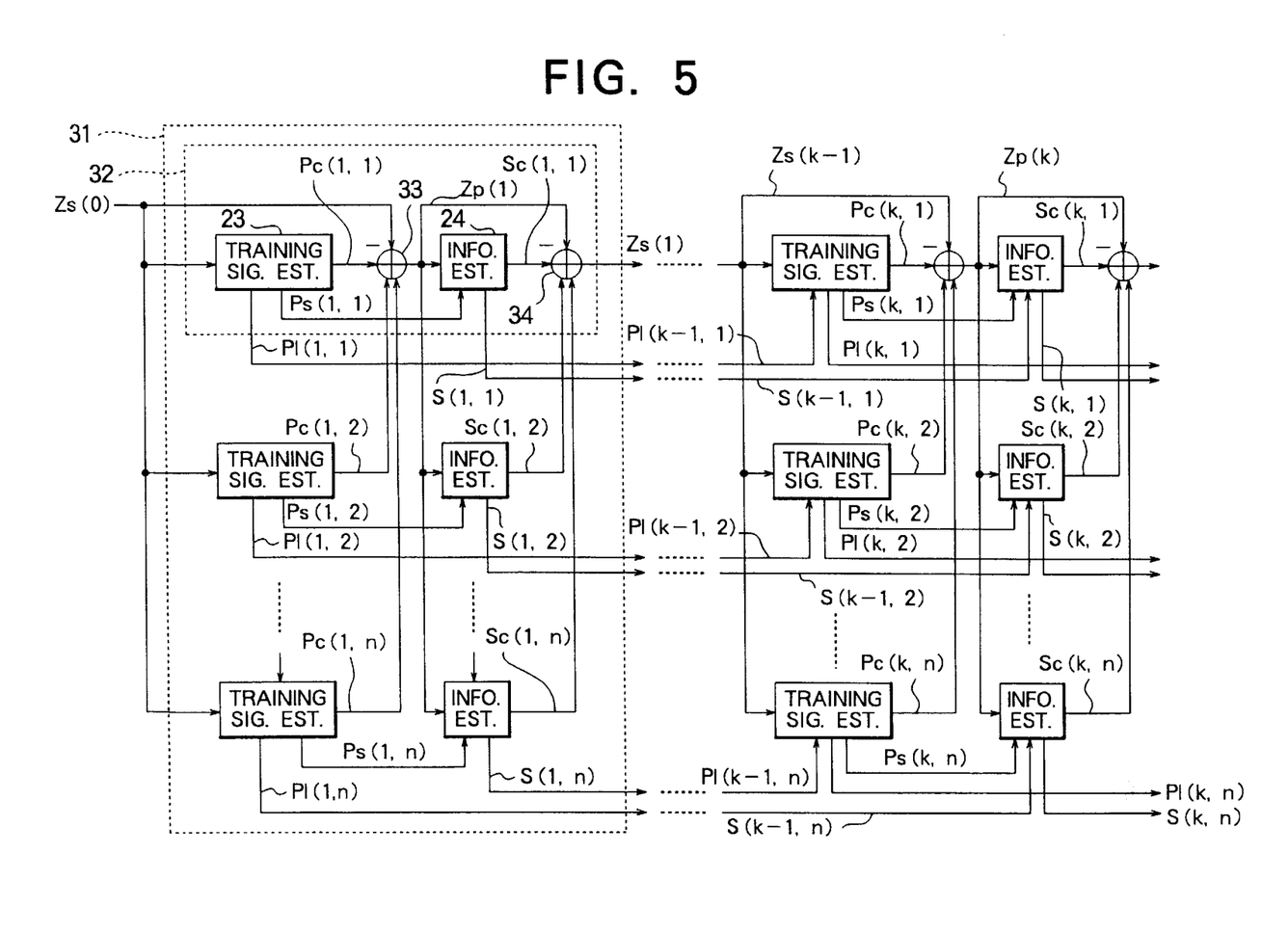
FIG. 5 is a block diagram showing the internal structure of the interference canceler in the second embodiment of the invention.

The second embodiment is similar to the first, except that in each stage in the interference canceler, the training signal estimators 23 are coupled in parallel, and the information signal estimators 24 are coupled in parallel.

FIG. 5 shows the configuration of the interference canceler in the second embodiment. As in the first embodiment, there are k stages. The received baseband signal, now denoted Zs(0), is input to the first stage 31, which comprises n single-station interference cancelers 32, each having a training signal estimator 23 and information signal estimator 24. The internal configurations of the training signal estimator 23 and information signal estimator 24 are the same as in the first embodiment. The signals input to the correlators 44 and 53 are now denoted Zs(h−1) and Zp(h), however.

Differing from the first embodiment, all of the training signal estimators 23 in the first stage 31 receive the baseband signal Zs(0). Operating as in the first embodiment, each training signal estimator 23 outputs an estimated interference signal Pc(1, m), representing an estimate of the interference caused by the corresponding station's training signal. All of these estimated training interference signals Pc(1, m) ($1 \leq m \leq n$) are subtracted from the baseband signal Zs(0) by an adder 33, producing a difference signal Zp(1), which is supplied to all of the information signal estimators 24 in the first stage 31.

Each information signal estimator 24, operating as in the first embodiment, produces an estimated information interference signal Sc(1, m). All of these signals Sc(1, m) ($1 \leq m \leq n$) are subtracted from the difference signal Zp(1) by an adder 34, producing the residual signal Zs(1) that is supplied to the next stage.

The subsequent stages operate much like the first stage 31. All training signal estimators 23 in the h-th stage receive the same residual signal Zs(h−1), and process this signal in parallel. All information signal estimators 24 in the h-th stage receive the same difference signal Zp(h) and process this signal in parallel. The user signals output at the end of the interference cancellation process are produced by the decision units 55 in the last (k-th) stage.

The second embodiment provides advantages similar to the first embodiment, in that the interference caused by each training signal is estimated and canceled k times instead of just once, so that in the end, more accurate estimates are obtained, and interference due to the training signals is canceled more thoroughly than in a conventional interference canceler.

The preceding embodiments have used one single-station interference canceler per station, but L single-station interference cancelers can be provided for each transmitting station in each stage, where L is a path diversity factor greater than one. Each stage then comprises n×L single-station interference cancelers. In each group of L, the single-station interference cancelers generate the same spreading codes, but with different timing offsets that provide path diversity. In each group, the estimated information symbol values are combined by the well-known RAKE process.

The preceding embodiments have been confined to the removal of interference due to information signals and training signals, but similar techniques can be used to remove interference due to control signals, and other signals that are transmitted in the same frequency band with different spreading codes.

Those skilled in the art will recognize that further variations are possible within the scope claimed below.

What is claimed is:

1. A method of canceling interference in a code division multiple access communication system in which training signals having known values and information signals having unknown values are combined into a single received signal, comprising (a) in a first stage of a series of stages, the steps of:
  making successive estimates of said training signals and interference caused by said training signals;
  successively removing the interference estimated to be caused by said training signals from said received signal;
  making successive estimates of said information signals and interference caused by said information signals;
  successively removing the interference estimated to be caused by said information signals from said received signal; and
  outputting the estimated training signals, the estimated information signals, and a residual signal from which the interference estimated to be caused by said training signals and the interference estimated to be caused by said information signals has been removed;

(b) in each stage after said first stage of said series of stages, the steps of:
receiving the residual signal and estimated training signals output from a preceding stage in said series;
using the estimated training signals and the residual signal received from said preceding stage to re-estimate said training signals;
successively estimating residual interference caused by said training signals;
successively removing the estimated residual interference from the received residual signal;
making successive re-estimates of said information signals and estimates of residual interference caused by said information signals;
successively removing the residual interference estimated to be caused by said information signals from the received residual signal; and
outputting the re-estimated training signals, the re-estimated information signals,
and a residual signal from which the residual interference estimated to be caused by said training signals and the residual interference estimated to be caused by said information signals has been removed; and (c) the step of extracting information signals from said received signal after the interference estimated to be caused by said training signals and said information signals in said steps (a) and (b) has been removed.

2. The method of claim 1, wherein said step (a) further comprises, for each training signal, the steps of:
correlating at least a residual part of said received signal with a spreading code used with said training signal, to obtain a despread training signal;
estimating a channel parameter according to said despread training signal and a known value of said training signal;
applying said channel parameter to said known value of said training signal to obtain an estimated training signal; and
spreading said estimated training signal by said spreading code, thereby estimating the interference caused by said training signal.

3. The method of claim 1, wherein said step (a) is carried out serially, on one training signal and one information signal at a time.

4. The method of claim 1, wherein said step (a) is carried out in parallel on all training signals and all information signals, reducing said received signal to a residual signal, and are then repeated in parallel on said residual signal.

5. A method of canceling interference in a code division multiple access communication system in which training signals having known values and information signals having unknown values are combined into a single received signal, comprising:

(a) in a first stage of a series of stages, the steps of:
making successive estimates of said training signals and interference caused by said training signals;
successively removing the interference estimated to be caused by said training signals from said received signal;
making successive estimates of said information signals and interference caused by said information signals;
successively removing the interference estimated to be caused by said information signals from said received signal; and
outputting the estimated training signals, the estimated information signals, and a residual signal from which the interference estimated to be caused by said training signals and the interference estimated to be caused by said information signals has been removed;

(b) in each stage after said first stage of said series of stages, the steps of:
receiving the residual signal and the estimated information signals output from a preceding stage in said series;
making successive re-estimates of said training signals and estimates of residual interference caused by said training signals;
successively removing the residual interference estimated to be caused by said training signals from the received residual signal;
using the estimated information signals and the residual signal received from said preceding stage to re-estimate said information signals;
successively estimating residual interference caused by said information signals; and
successively removing the estimated residual interference caused by said information signals from said residual signal; and
outputting the re-estimated training signals, the re-estimated information signals, and a residual signal from which the residual interference estimated to be caused by said training signals and the residual interference estimated to be caused by said information signals has been removed; and (c) the step of extracting information signals from said received signal after the interference estimated to be caused by said training signals and said information signals in said steps (a) and (b) has been removed.

6. The method of claim 5, wherein said step (a) further comprises, for each training signal, the steps of:
correlating at least a residual part of said received signal with a spreading code used with said training signal, to obtain a despread training signal;
estimating a channel parameter according to said despread training signal and a known value of said training signal;
applying said channel parameter to said known value of said training signal to obtain an estimated training signal; and
spreading said estimated training signal by said spreading code, thereby estimating the interference caused by said training signal.

7. The method of claim 5, wherein said steps (a) are carried out serially, on one training signal and one information signal at a time.

8. The method of claim 5, wherein said steps (a) are carried out in parallel on all training signals and all information signals, reducing said received signal to a residual signal, and are then repeated in parallel on said residual signal.

9. A receiver for receiving a signal in which training signals having known values are combined with information signals having unknown values by code division multiple access spectrum spreading, comprising:
an interference canceler that makes successive estimates of interference caused by the training signals, successively removes the interference estimated to be caused by the training signals from the received signal, makes successive estimates of interference caused by the information signals, successively removes the interference estimated to be caused by the information signals from the received signal, and extracts the information signals from the received signal after the interference estimated to be caused by the training signals and the interference estimated to be caused by the information signals have been removed, said interference canceler comprising:

a plurality of training signal estimators that use respective training signals to estimate respective channel parameters, and use said channel parameters to estimate the interference caused by respective training signals; and a plurality of information signal estimators that use the channel parameters estimated by respective training signal estimators to estimate the interference caused by said information signals, said interference canceler being organized into a series of stages, from a first stage, to which said received signal is supplied, to a last stage, in which said information signals are extracted, each stage having a plurality of said training signal estimators and a plurality of said information signal estimators;

each said stage, except said last stage, finishes a next stage in said series with a residual signal from which the interference estimated so far by the training signal estimators and information signal estimators has been removed;

in each stage, except said last stage, the training signal estimators estimate respective training signals and the information signal estimators estimate respective information signals, these estimated training signals and estimated information signals being supplied to the next stage in said series; and in each stage, except said first stage, the training signal estimators use said residual signal and the estimated training signals received from a preceding stage in said series to re-estimate said training signals, and the information signal estimators use said residual signal and the estimated information signals received from the preceding stage to re-estimate said information signals.

10. The receiver of claim 9, wherein said information signal estimators estimate said information signals by making a hard decision.

11. The receiver of claim 9, wherein said information signal estimators estimate said information signals by making a soft decision.

12. The receiver of claim 9, wherein the training signal estimators in said first stage operate in parallel on said received signal, and the training signal estimators in each stage after said first stage operate in parallel on the residual signal received by said other stage after said first stage.

13. The receiver of claim 9, wherein the training signal estimators in each said stage operate serially.

14. The receiver of claim 9, wherein said receiver receives signals from n transmitting stations, n being a positive integer, and each said stage has n training signal estimators and n information signal estimators.

15. The receiver of claim 9, wherein said receiver receives signals from n transmitting stations, n being a positive integer, and each said stage has n×L training signal estimators and n×L information signal estimators, L being a path diversity factor.

16. The receiver of claim 9, wherein for each training signal, said interference canceler has at least one training signal estimator comprising:

a spreading-code generator for generating a spreading code;

a training signal generator for generating a known training signal;

a correlator for correlating an input signal with said spreading code to obtain a despread training signal;

a channel estimator for estimating a channel parameter according to said known training signal and said despread training signal;

a first multiplier for applying said channel parameter to said known value of said training signal to obtain an estimated training signal; and a second multiplier for spreading said estimated training signal by said spreading code, thereby estimating the interference caused by said training signal.

17. The receiver of claim 16 wherein said input signal is said received signal in at least one of said training signal estimators, and is a residual signal, from which some interference has already been removed, in at least another one of said training signal estimators.

* * * * *